(12) United States Patent
Hudis et al.

(10) Patent No.: US 8,955,105 B2
(45) Date of Patent: Feb. 10, 2015

(54) ENDPOINT ENABLED FOR ENTERPRISE SECURITY ASSESSMENT SHARING

(75) Inventors: Efim Hudis, Bellevue, WA (US); Yair Helman, Kefar Neter (IL); Joseph Malka, Haifa (IL); Uri Barash, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1326 days.

(21) Appl. No.: 11/724,060

(22) Filed: Mar. 14, 2007

(65) Prior Publication Data

US 2008/0229414 A1  Sep. 18, 2008

(51) Int. Cl.
*G06F 11/00*  (2006.01)

(52) U.S. Cl.
USPC .......................................................... 726/22

(58) Field of Classification Search
USPC ................................................... 726/22–25
See application file for complete search history.

(56) References Cited

U.S. PATENT DOCUMENTS

| | | |
|---|---|---|
| 5,948,104 A | 9/1999 | Gluck et al. |
| 5,983,270 A | 11/1999 | Abraham et al. |
| 6,226,372 B1 | 5/2001 | Beebe et al. |
| 6,321,338 B1 | 11/2001 | Porras et al. |
| 6,353,385 B1 | 3/2002 | Molini et al. |
| 6,530,024 B1 | 3/2003 | Proctor |
| 6,647,400 B1 | 11/2003 | Moran |
| 6,772,345 B1 | 8/2004 | Shetty |
| 6,925,443 B1 | 8/2005 | Baggett, Jr. et al. |
| 6,986,060 B1 | 1/2006 | Wong |

(Continued)

FOREIGN PATENT DOCUMENTS

| | | |
|---|---|---|
| JP | 2004-021549 | 1/2004 |
| JP | 2004-046742 | 2/2004 |

(Continued)

OTHER PUBLICATIONS

Mahambre et al., "A Taxonomy and Classification of Adaptive Event Based Middleware with Support for Service Guarantees", Nov. 15, 2006, 8 pages.

(Continued)

*Primary Examiner* — Anthony Brown
(74) *Attorney, Agent, or Firm* — Ben Tabor; Kate Drakos; Micky Minhas

(57) ABSTRACT

An enterprise-wide sharing arrangement uses a semantic abstraction, called a security assessment, to share security-related information between security products, called endpoints. A security assessment is defined as a tentative assignment by an endpoint of broader contextual meaning to information that is collected about an object of interest. Endpoints utilize an architecture that comprises a common assessment sharing agent and a common assessment generating agent. The common assessment sharing agent is arranged for subscribing to security assessments, publishing security assessments onto a channel, maintaining an awareness of configuration changes on the channel (e.g., when a new endpoint is added or removed), and implementing security features like authorization, authentication and encryption. A common assessment generating engine handles endpoint behavior associated with a security assessment including assessment generation, cancellation, tracking, and rolling-back actions based on assessments that have expired. The common assessment generating engine generates and transmits messages that indicate which local actions are taken.

17 Claims, 10 Drawing Sheets

(56) References Cited

U.S. PATENT DOCUMENTS

| | | | |
|---|---|---|---|
| 6,990,591 B1 | 1/2006 | Pearson | |
| 7,028,338 B1 | 4/2006 | Norris et al. | |
| 7,065,657 B1 | 6/2006 | Moran | |
| 7,093,294 B2 | 8/2006 | Lingafelt et al. | |
| 7,120,934 B2 | 10/2006 | Ishikawa | |
| 7,124,438 B2 | 10/2006 | Judge et al. | |
| 7,134,141 B2 | 11/2006 | Crosbie et al. | |
| 7,152,105 B2 | 12/2006 | McClure et al. | |
| 7,152,242 B2 | 12/2006 | Douglas | |
| 7,162,649 B1 | 1/2007 | Ide et al. | |
| 7,174,566 B2 | 2/2007 | Yadav | |
| 7,178,166 B1* | 2/2007 | Taylor et al. | 726/25 |
| 7,319,951 B2 | 1/2008 | Rising et al. | |
| 7,325,252 B2 | 1/2008 | Bunker et al. | |
| 7,346,922 B2 | 3/2008 | Miliefsky | |
| 7,451,488 B2 | 11/2008 | Cooper et al. | |
| 7,458,094 B2* | 11/2008 | Jackson | 726/2 |
| 7,530,104 B1 | 5/2009 | Thrower et al. | |
| 7,558,848 B1 | 7/2009 | Shokhor | |
| 7,614,085 B2 | 11/2009 | Ben-Itzhak | |
| 7,644,271 B1 | 1/2010 | Cherepov et al. | |
| 7,647,622 B1 | 1/2010 | Sobel et al. | |
| 7,661,136 B1 | 2/2010 | Spielman | |
| 7,793,338 B1 | 9/2010 | Beddoe et al. | |
| 2003/0051163 A1 | 3/2003 | Bidaud | |
| 2003/0120955 A1 | 6/2003 | Bartal et al. | |
| 2003/0126449 A1 | 7/2003 | Kelly et al. | |
| 2003/0131256 A1 | 7/2003 | Ackroyd | |
| 2003/0159069 A1 | 8/2003 | Choi et al. | |
| 2003/0208689 A1 | 11/2003 | Garza | |
| 2004/0010709 A1 | 1/2004 | Baudoin et al. | |
| 2004/0025042 A1* | 2/2004 | Kouznetsov et al. | 713/200 |
| 2004/0098623 A1 | 5/2004 | Scheidell | |
| 2004/0111643 A1 | 6/2004 | Farmer | |
| 2004/0255167 A1 | 12/2004 | Knight | |
| 2004/0260733 A1 | 12/2004 | Adelstein et al. | |
| 2004/0260778 A1* | 12/2004 | Banister et al. | 709/206 |
| 2004/0260945 A1 | 12/2004 | Raikar | |
| 2005/0015626 A1 | 1/2005 | Chasin | |
| 2005/0033989 A1 | 2/2005 | Poletto et al. | |
| 2005/0050318 A1 | 3/2005 | Alone et al. | |
| 2005/0076238 A1 | 4/2005 | Ormazabal et al. | |
| 2005/0080816 A1 | 4/2005 | Shipp | |
| 2005/0086534 A1* | 4/2005 | Hindawi et al. | 713/201 |
| 2005/0102534 A1 | 5/2005 | Wong | |
| 2005/0114658 A1 | 5/2005 | Dye et al. | |
| 2005/0132041 A1 | 6/2005 | Kundu | |
| 2005/0188272 A1 | 8/2005 | Bodorin et al. | |
| 2005/0204169 A1 | 9/2005 | Tonnesen | |
| 2005/0204404 A1 | 9/2005 | Hrabik et al. | |
| 2005/0251570 A1 | 11/2005 | Heasman et al. | |
| 2005/0257267 A1 | 11/2005 | Williams et al. | |
| 2005/0268112 A1 | 12/2005 | Wang et al. | |
| 2005/0289649 A1 | 12/2005 | Mitomo et al. | |
| 2006/0005254 A1 | 1/2006 | Ross | |
| 2006/0018466 A1 | 1/2006 | Adelstein et al. | |
| 2006/0031938 A1* | 2/2006 | Choi | 726/25 |
| 2006/0070130 A1 | 3/2006 | Costea et al. | |
| 2006/0075494 A1 | 4/2006 | Bertman et al. | |
| 2006/0080637 A1 | 4/2006 | Treit et al. | |
| 2006/0123478 A1 | 6/2006 | Rehfuss et al. | |
| 2006/0130139 A1* | 6/2006 | Sobel et al. | 726/22 |
| 2006/0179296 A1 | 8/2006 | Bartlett et al. | |
| 2006/0202999 A1 | 9/2006 | Thornton | |
| 2006/0224724 A1 | 10/2006 | Marinescu et al. | |
| 2006/0236392 A1 | 10/2006 | Thomas et al. | |
| 2006/0236401 A1 | 10/2006 | Fosdick | |
| 2006/0259819 A1 | 11/2006 | Connor | |
| 2006/0259968 A1 | 11/2006 | Nakakoji et al. | |
| 2006/0265689 A1 | 11/2006 | Kuznetsov et al. | |
| 2006/0268112 A1 | 11/2006 | Ikeda | |
| 2006/0272011 A1 | 11/2006 | Ide et al. | |
| 2006/0272859 A1 | 12/2006 | Pastusek et al. | |
| 2006/0294588 A1 | 12/2006 | Lahann et al. | |
| 2007/0006310 A1 | 1/2007 | Piccard | |
| 2007/0016951 A1 | 1/2007 | Piccard et al. | |
| 2007/0094491 A1 | 4/2007 | Teo et al. | |
| 2007/0100835 A1 | 5/2007 | Carter | |
| 2007/0101440 A1 | 5/2007 | Bhatia et al. | |
| 2007/0153689 A1 | 7/2007 | Strub et al. | |
| 2007/0261120 A1 | 11/2007 | Arbaugh et al. | |
| 2008/0046556 A1 | 2/2008 | Nicholls et al. | |
| 2008/0127337 A1 | 5/2008 | Dawson et al. | |
| 2008/0134289 A1 | 6/2008 | McConnell et al. | |
| 2008/0229414 A1 | 9/2008 | Hudis et al. | |

FOREIGN PATENT DOCUMENTS

| | | |
|---|---|---|
| KR | 10-2001-0085057 | 9/2001 |
| KR | 10-2003-0039149 | 5/2003 |
| KR | 10-2003-0057929 | 7/2003 |
| WO | 02/097587 | 12/2002 |
| WO | 03/093960 | 11/2003 |
| WO | 2006/047163 | 5/2006 |

OTHER PUBLICATIONS

Kamara, et al., "Analysis of Vulnerabilities in Internet Firewalls", Apr. 2003, 17 pages.

Mayer, et al., "Fang: A Firewall Analysis Engine," 2000, 11 pages.

Zaffar et al., "Cooperative Forensics Sharing" In: 1st Bio-Inspired models of Network,Information and Computing Systems Conference 2003, Dec. 2006, pp. 1-9.

Danielsson, "A System for collection and Analysis of Forensic Evidence", Nov. 2, 2003, pp. 1-78.

Broucek, et al. "Intrusion Detection: Forensic Computing Insights arising from a Case Study on SNORT", EICR Conference Best Paper Proceedings 2003, 19 pages.

Al-Hammadi et al., "Detecting Botnets Through Log Correlation", University of Nottingham, Nottingham UK, 2006, 4 pages.

Payer, "Realtime Intrusion-Forensics a First Prototype Implementation", (based on a stack-based NIDS), Selected Papers from the TERENA Networking Conference, 2004, 8 pages.

Abad et al., "Log Correlation for Intrusion Detection: A Proof of Concept", National Center for Advanced Secure Systems Research, 2003, 10 pages.

Levine et al., "The Use of Honeynets to Detect Exploited Systems Across Large Enterprise Networks", Proceedings of the 2003 IEEE, Jun. 2003, 8 pages.

Chandrasekaran, et al.,"AVARE: Aggregated Vulnerability Assessment and Response against Zero-day Exploits", Performance, Computing, and Communications Conference, 2006, 25th IEEE International Conference, Apr. 10-12, 2006, 8 pages.

"EMCO Network Malware Cleaner" retrieved at: <http://www.emco.is/networkmailwarecleaner/features.html>, Feb. 14, 2007, 6 pages.

Norman SandBox Product Suite—areas of application, retrieved at: <http://www.norman/com/microsites/mailwareanalyzer/technology/37799/en>, retrieved on Feb. 14, 2007, 2 pages.

Ding, "An Extended Immune-based Model for Computer Forensics", International Conference on Computer Science and Software Engineering, 2008, vol. 1, Dec. 12, 2008, pp. 1166-1169.

Beckett, et al., "Digital Forensics: Validation and Verification in a Dynamic Work Environment", IEEE Computer Society, Proceedings of the 40th Annual Hawaii International Conference on System Sciences, Jan. 2007, 10 pages.

Author Unknown, "First Draft text of X.crs: Correlative Reacting System in mobile data communication; TD 2442 Rev. 1", ITU-T Drafts; Study Period 2005-2008, International Telecommunication Union, Geneva; CH; Vol Study Group 17 Dec. 6, 2006, 53 pages.

Gonzalo Alvarez, et al. "A new taxonomy of Web attacks suitable for efficient encoding", in: Computer & Security, Jul. 2003, vol. 22, Issue 5, pp. 435-449.

Douglas Harris, et al., "Standards for secure data sharing across Organizations", In: Computer Standards & Interfaces, Jan. 2007, vol. 29, Issue 1, pp. 86-96.

Japanese Notice of Rejection issued Apr. 19, 2013 in connection with corresponding Japanese Patent Application No. 2009-553835 with English Language translation (3 pages total).

* cited by examiner

ENDPOINT ENABLED FOR ENTERPRISE SECURITY ASSESSMENT SHARING

BACKGROUND

In an enterprise computing environment, for example, an office of a business, a number of personal computers, workstations, servers and the like, along with other devices such as mass storage subsystems, internal network interfaces, and external network interfaces, are typically interconnected to provide an integrated environment in which information may be generated, accessed from external sources, and shared among various users. Commonly, users perform a variety of operations including order receipt, manufacturing, shipping, billing, inventory control, document preparation and management, e-mail, web browsing, and other operations in which creation, access, and sharing of data is beneficial.

Currently, security is typically provided for an enterprise using a variety of different security products that are each normally arranged to monitor only a partial portion of enterprise-wide data. That is, security products are arranged as separate local "islands" where each product monitors, assesses, and takes action with respect to different parts of the data within the enterprise. For example, an enterprise may utilize a combination of security products such as a product that protects host computers in the enterprise, an edge firewall product, a network intrusion detection system ("NIDS") product, a network access protection ("NAP") product, and other discrete security products in order to provide security for the various different parts of the enterprise.

While these security products often perform satisfactorily in many applications, current enterprise security solutions are not scalable in a cost effective manner, nor is straight-forward extensibility supported where a new end point may be provisioned without the need for enterprise-wide reconfiguration of existing rules. It has also been difficult to provide effective common management across all the enterprise security product islands. Current attempts to correlate enterprise-wide security data have high management and maintenance costs.

This Background is provided to introduce a brief context for the Summary and Detailed Description that follows. This Background is not intended to be an aid in determining the scope of the claimed subject matter nor be viewed as limiting the claimed subject matter to implementations that solve any or all of the disadvantages or problems presented above.

SUMMARY

An enterprise-wide sharing arrangement called "ESAS—Enterprise Security Assessment Sharing" is provided in which a semantic abstraction, called a security assessment, is created to enable sharing of security-related information between different security products, called endpoints, in an enterprise security environment. A security assessment is defined as a tentative assignment by an endpoint of broader contextual meaning to information (i.e., data in some context) that is collected about an object of interest in the environment such as a computer, user, service (e.g., a website), data, or the enterprise as whole. The security assessment utilizes a concise vocabulary for an endpoint to declare that an object in the environment falls into a particular assessment category such as "compromised" or "under attack" along with the severity (e.g., low, medium, high, critical) of the detected incident.

A security assessment is tentative because it is subject to some uncertainty and is valid for a limited period of time. The tentative nature of a security assessment is reflected in two of its components: a fidelity field which expresses the level of confidence the endpoint has its assignment of contextual meaning, and a time-to-live ("TTL") field which reflects the endpoint's estimate of the time period for which the security assessment is expected to be valid. Thus, for example, a security assessment may be used by an endpoint to declare, in light of that endpoint's current understanding of security incidents, that a particular machine is compromised, with a critical level of severity, with medium fidelity, and having a TTL of 30 minutes. A variety of types of security assessments may be used in any given enterprise security environment having varying combinations of assessment categories and severities.

Endpoints are enabled with functionality to publish security assessments onto a security assessment channel operating in the environment, as well as subscribe to a subset of available security assessments published by other endpoints. The security assessments existing in the environment that are active (i.e., those having a TTL which indicates the assessments are still valid) function to provide a security context that gives such ESAS-enabled endpoint with a new way to look at its own locally-available information. That is, the security context enables the ESAS-enabled endpoint to combine or correlate evidence from security assessments received from a variety of different sources, and across object types, in order to significantly enhance the quality of its detection of potential security incidents. The ESAS-enabled endpoint then makes a decision as to what local action or response is appropriate for each type of security assessment (whether received from another endpoint or internally generated by the endpoint itself) in accordance with a set of response policies. Incident detection is both efficient and cost-effective because the security context enables distributed processing of enterprise-wide information, in the form of security assessments, without the burden of sharing large amounts of raw data throughout the enterprise (most of which is completely irrelevant due to the lack of any context). ESAS-enabled endpoints are further arranged to roll-back the local action upon expiration of the security assessment that prompted the local action (i.e., when the security assessment exceeds the time-to-live specified in the TTL field).

In an illustrative example, an ESAS-enabled endpoint utilizes an architecture that comprises a common assessment sharing agent and a common assessment generating agent. The common assessment sharing agent is arranged for subscribing to security assessments, publishing security assessments onto the security assessment sharing channel, maintaining an awareness of configuration changes on the channel (i.e., when a new endpoint is added or removed), and implementing security features such as authorization, authentication and encryption. A common assessment generating engine handles the endpoint behavior associated with a security assessment including assessment generation, cancellation, tracking, and rolling-back actions based on assessments that have expired. The common assessment generating engine also generates and transmits messages that indicate which local actions are taken.

The present ESAS arrangement provides a number of advantages. By employing a security assessment having a concise vocabulary, overall data complexity in the enterprise is drastically reduced and only meaningful information is shared between endpoints. Use of the security assessment also eliminates the need to collect very large amounts of raw data in a central storage location, and thereby enables highly scalable enterprise security solutions to be built on a very cost effective basis. In addition, a new endpoint may be readily deployed with on-demand extensibility. Security assessments may be shared between the new endpoint and existing endpoints without the need to reconfigure any of the response policies within existing endpoints. The new endpoint simply functions as a new source of security assessments using a semantic abstraction that the existing endpoints already understand. Thus, endpoints from different manufacturers and suppliers may be mixed in an enterprise security environment by utilizing the common ESAS interface, and the interface is extensible to additional features and options that may be added over time.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Analysis of current enterprise security solutions indicates that there are still significant opportunities for addressing customer needs. For example, each separate security product tends to have high rates of false positive and false negative detection of security incidents such as those produced through actions of malware or malicious users. Such low fidelity detection occurs because data from a single type of source (i.e., a subset of the enterprise-wide data) does not normally provide the context needed to make an accurate assessment of the security incident.

The use of automatic actions or responses is very infrequent as a result of the low fidelity detection since confidence in the validity of the detected incident is low. In addition, the typical response to a detected incident tends to be very harsh, for example, a user or machine may be disconnected from the network. Since such harsh actions generally impose significant costs to business activity in the enterprise, automation of such actions based on low fidelity detection is not generally performed.

Upon detection of an incident of interest, current security products typically perform investigation to determine the validity of the detection (i.e., whether the incident is true or false) and what action to take in response. Significant resources are expended on investigation to review the detailed data that is collected which may be relevant to the detected incident. Because it is not feasible to collect all data at all times, a security product collects only a subset of the available data through application of policies defined by an administrator. Such policies are often static and are commonly defined based on the storage capacity of the collection system, and not necessarily by the relevance of the incident data or the data source.

When an incident is detected, application of the policies typically results in a review of the data which triggered the detection. When this data is deemed insufficient to generate a high fidelity response, typically even more data is collected. For example, all of the data traffic into and out of a suspected compromised machine may be monitored. In many cases, a large amount of data is collected but is never used and has statistical significance only as noise. Consequently, many present security products collect an often overwhelming amount of noise, but not enough relevant data is collected.

Figure 1:
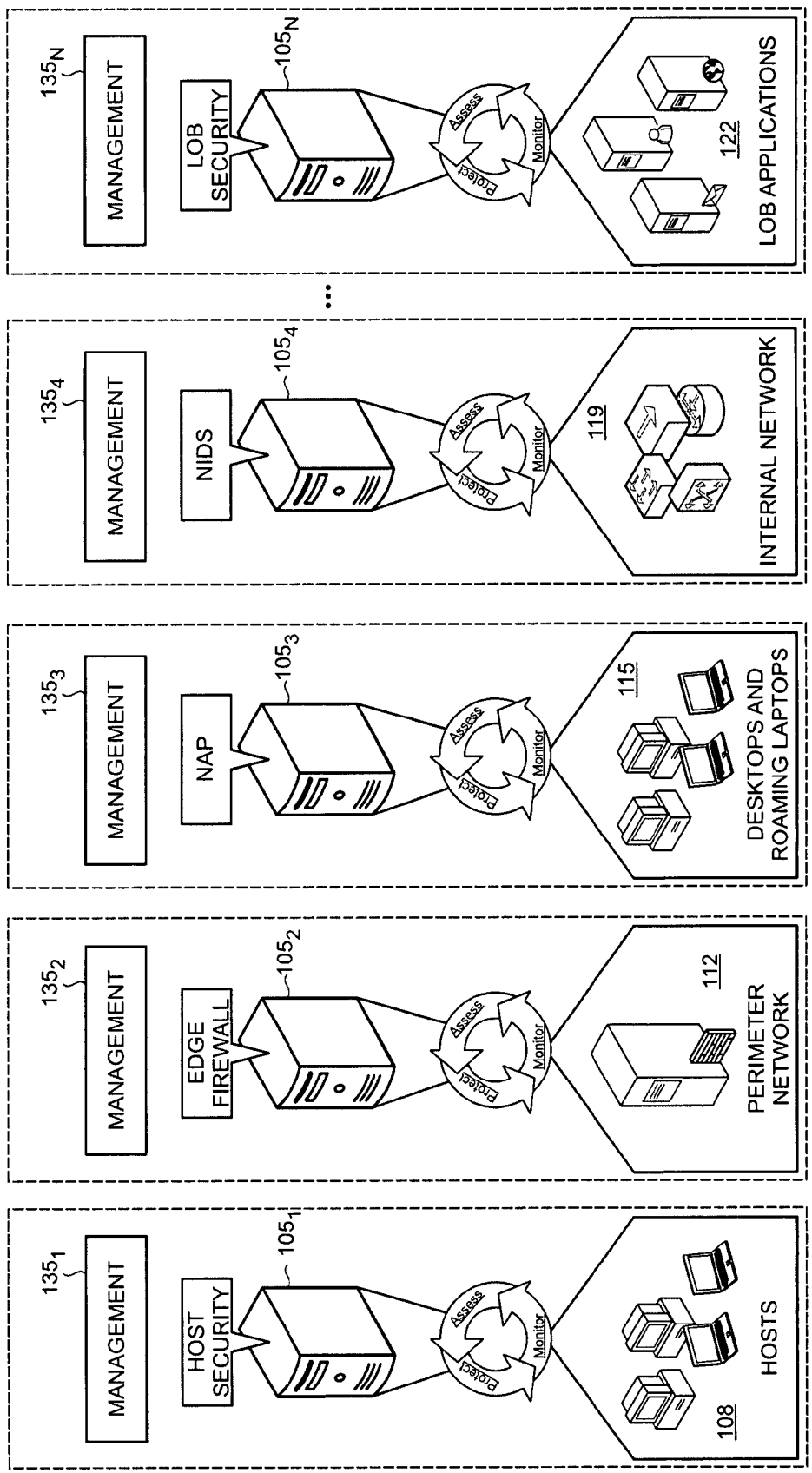
FIG. 1 shows an illustrative enterprise security environment in which the present enterprise security assessment sharing may be implemented.

Turning now to the figures where like reference numerals indicate like elements, FIG. 1 shows an illustrative enterprise security environment 100 in which a variety of security products 105-1, 2 . . . N, called endpoints, are deployed. It is emphasized that the number and type of endpoints 105 shown in FIG. 1 are merely illustrative and the specific number of endpoints can be scaled up or down, and different types of security products/endpoints can be utilized, depending on the requirements of a specific application of enterprise security assessment sharing. For example, in addition to those shown in FIG. 1 and described below, web application protection products, SEM/SIM (Security Event Management/Security Incident Management) products, operational heath monitoring and configuration management products (e.g., Microsoft Windows® Software Update Services, Microsoft Operations Manager), or identity management products (e.g., Microsoft Active Directory) are also usable in some applications.

In enterprise security environment 100, a host security endpoint $105_1$ is deployed to protect, assess, and monitor a plurality of host computers 108 in the enterprise 100. A commercial example of the host security endpoint $105_1$ is Microsoft Forefront Client Security® which provides unified malware protection for the enterprise's desktops, laptops, and server operating systems.

An edge firewall $105_2$ is a security product that is arranged to protect the enterprise environment 100 from Internet-based threats while providing users with remote access to applications and data through a perimeter network 112. Edge firewall $105_2$ may be embodied by, for example, a Microsoft Internet Security and Acceleration® ("ISA") server.

A NAP security endpoint $105_3$ performs computer health policy validation by ensuring ongoing compliance with health policies defined by an administrator. Typically, access is restricted for computers (e.g., desktops and roaming laptops 115) monitored by the NAP security endpoint $105_3$ that do not comply with system health requirements.

A NIDS security endpoint $105_4$ analyzes traffic inside the enterprise 100 over an internal network 119. The NIDS security endpoint $105_4$ operates to detect malicious activity such as denial of service attacks port scans by monitoring network traffic on the internal network 119.

A line-of-business security endpoint 105$_N$ protects various line-of-business applications 122. Line-of-business applications 122 include, for example, an e-mail application such as Microsoft Exchange® that is used in the enterprise 100. Security endpoint 105$_N$ typically monitors e-mail to provide anti-virus and anti-spam protection.

Each of the security endpoints 105 in the enterprise 100 are normally arranged as individual islands, as indicated by the dashed rectangles in FIG. 1. Accordingly, each security endpoint 105 is arranged for monitoring a subset of the available data pertaining to objects in the enterprise 100 and for performing localized actions in response to a detected incident. In addition, each endpoint typically includes a local management function 135-1, 2 . . . N. As noted above, the individual local management functions are not generally integrated to provide a single point of management.

Figure 2:
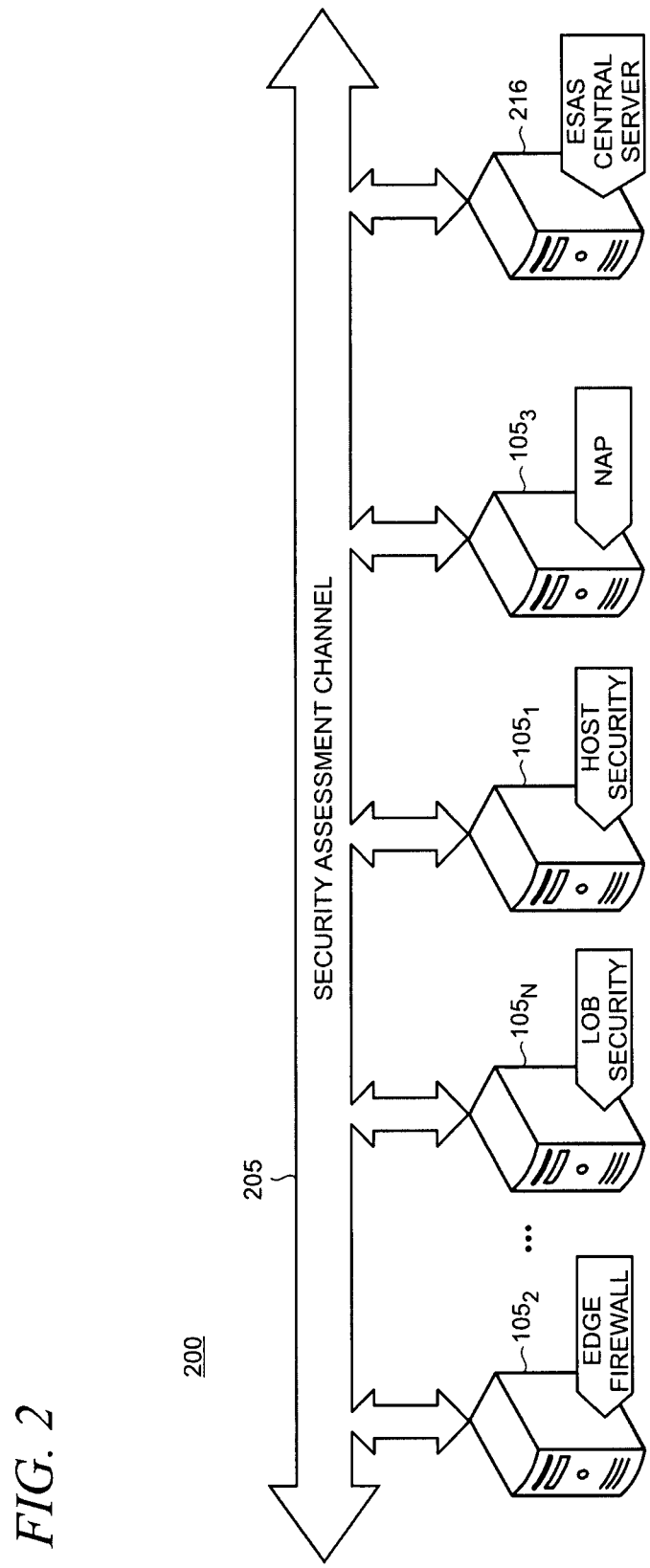
FIG. 2 shows an illustrative enterprise security assessment sharing arrangement in which a channel is provided to enable a security assessment to be shared among multiple endpoints.

FIG. 2 shows an illustrative ESAS arrangement 200 in which a channel 205 is provided to enable a semantic abstraction called a "security assessment" to be shared among multiple endpoints using a language/protocol that is commonly-utilized at each endpoint. The security assessment channel 205 facilitates a publish/subscribe model used by the endpoints for connecting the sources of security assessments (publishers) to the consumers of the security assessments (subscribers). As shown, both the publishers and subscribers on the security assessment channel 205 are endpoints 105.

The endpoints are enabled with functionality to publish security assessments onto the security assessment channel 205, as well as subscribe to a subset of available security assessments published by other endpoints. Active security assessments in the environment function to provide a security context that gives these ESAS-enabled endpoints with a new way to look at their own locally-available information. Active security assessments are those having a time-to-live ("TTL") field which indicates they are still valid, as described in more detail below.

The security context enables the ESAS-enabled endpoint to combine or correlate evidence from security assessments received from a variety of different sources, and across object types, in order to significantly enhance the quality of its detection of potential security incidents. The ESAS-enabled endpoint then makes a decision as to what local action or response is appropriate using the security context in combination with its own security expertise (i.e., correlation rules), and locally-available data. Such decision-making is both efficient and cost-effective because the security context enables distributed processing of enterprise-wide information in the form of security assessments without the burden of sharing huge amounts of raw data throughout the enterprise (most of which is completely irrelevant due to the lack of any context). ESAS-enabled endpoints are arranged to roll-back the local action upon expiration of the security assessment that prompted the local action (i.e., when the security assessment exceeds the time-to-live specified in the TTL field).

The endpoints 105 are isolated from the mechanics of the actual transport and management of the publish/subscribe model through a semantic abstraction layer that is arranged to simplify interactions with the security assessment channel 205. The abstraction layer comprises tables describing the security assessment types to which the endpoints subscribe, and tables describing the security assessment types that endpoints publish (as described below, not all endpoints generally subscribe to all security assessment types). In addition, the abstraction layer provides an API (application programming interface) for reading received security assessments, and an API for generating security assessments.

A specialized endpoint, ESAS central server 216, is coupled to the security assessment channel 205 and performs as a centralized audit point for the ESAS arrangement 200. Accordingly, the ESAS central server 216 subscribes to all security assessments and permanently logs them. ESAS central server 216 also receives and logs messages from the endpoints that indicate the local actions that are taken by an endpoint. The ESAS central server 216 thus provides administrators with security assessment monitoring functionality that gives a comprehensive view of the history and current status of the enterprise as a whole, and each ESAS-enabled endpoint.

Figure 3:
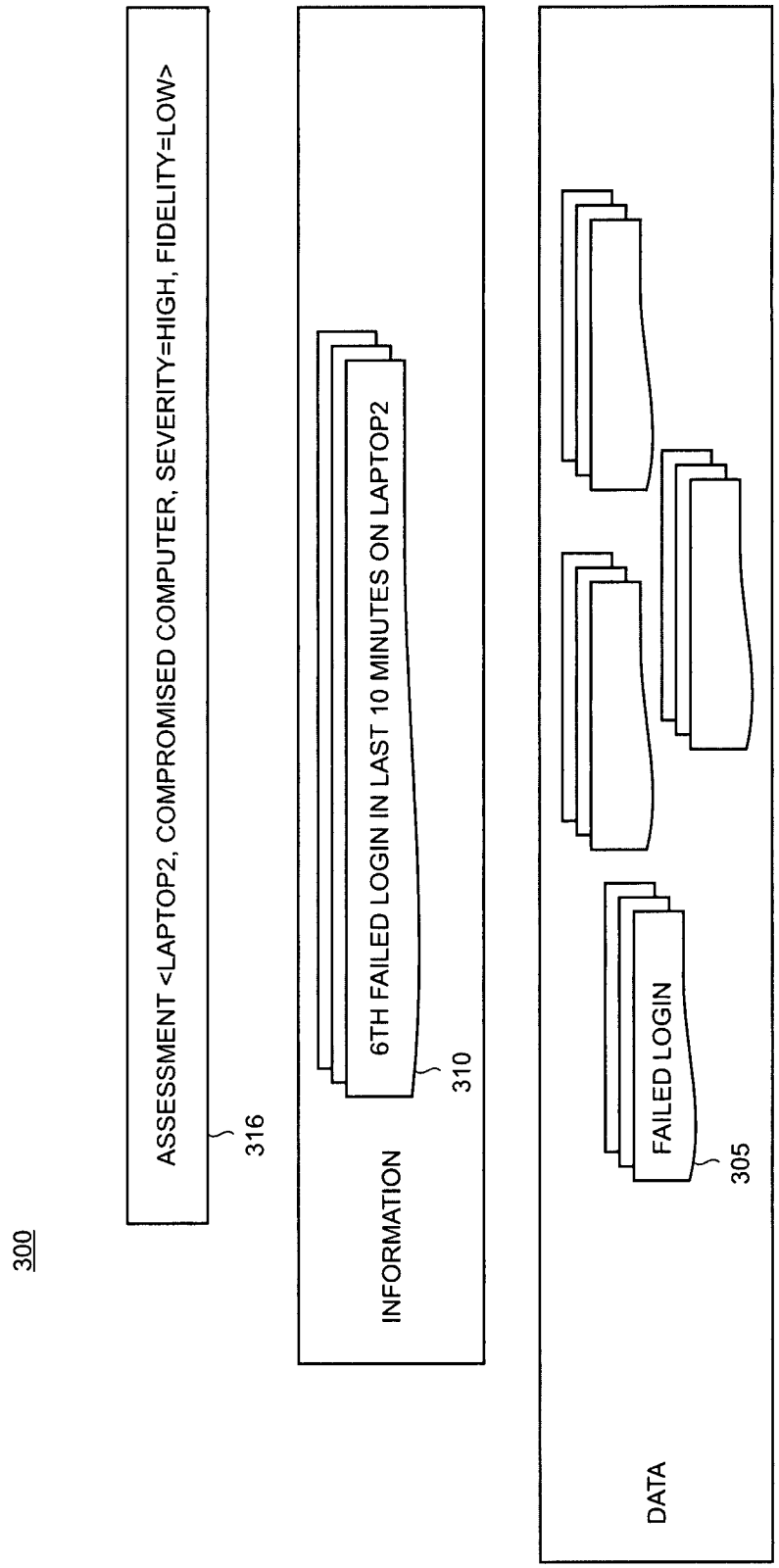
FIG. 3 shows an illustrative terminology hierarchy that underlies a security assessment.

FIG. 3 shows an illustrative terminology hierarchy 300 that underlies a security assessment. A security assessment is defined as a tentative assignment of security meaning, or category, to information. Information, as used here, is defined as data with some context. Data is defined as discrete items devoid of context. These definitions may be further described by way of an example. As shown in FIG. 3, a piece of data 305 is an event in an event log such as a failed login. Information 310 is data provided with context which, in this example, is that the failed login was the sixth such failure within 10 minutes on the same machine, a laptop named Laptop2. The security assessment 316, in this example, indicates that Laptop2 is categorized in a particular way, namely that it is assessed with a category of "Compromised," with high "severity," and where such assessment has low "fidelity" (these terms are defined and discussed below in more detail).

A security assessment may be performed on any object of interest in an enterprise security environment, such as a user or a device. In this illustrative example, assessments include four main object types: 1) Host—assessments about computers in an enterprise; 2) User—assessments about users or accounts in enterprise; 3) Service—assessments about a service provided to the enterprise such as a URL (Uniform Resource Locator) of a web site that has a reputation as being malicious; 4) Enterprise—assessments about the enterprise as a whole or a well-defined subset of the enterprise such as a department, subnet, site, or branch; and 5) Data—assessments about business-related data (e.g., as found in documents, e-mail, business data in a database etc.) that is present or accessed by objects in the enterprise.

It is emphasized that these object types are merely illustrative, and other object types may be used as required by specific scenarios. In most applications of enterprise security assessment sharing, endpoints only publish, and subscribe to, a subset of all of the available security assessment types since particular endpoints are generally going to have interest in particular objects in the enterprise environment. In addition, while some endpoints will be both publishers and subscribers, there is no requirement for every endpoint to support both functionalities. For these reasons, the publish/subscribe model used herein is said to be loosely-coupled.

Table 1 below shows an illustrative set of assessment categories, and their mapping to specific object types, that may be contained in a typical security assessment:

TABLE 1

| Object Type | Assessment category | Description |
|---|---|---|
| Host | Vulnerable machine | Machine had vulnerable configuration or is missing some patches. |

TABLE 1-continued

| Object Type | Assessment category | Description |
|---|---|---|
| | Compromised machine | An endpoint detected some evidence that the machine might be compromised by a malicious software/user. |
| | Machine under attack | An attack attempt was detected without an evidence for success |
| | Machine of interest | An endpoint has a general suspicion about a machine without the ability to pin point what is wrong. |
| User | Compromised user | An endpoint detects some evidence that the user/account might be compromised. |
| | User under attack | An attack attempt was detected without an evidence for success |
| | Malicious user | An endpoint or an administrator detects that a user is a malicious one and actively (i.e., on purpose) performs illegal actions. |
| | User of interest | An endpoint has a general suspicion about a user/account without the ability to pin point what is wrong. |
| Enterprise | Enterprise under attack | An endpoint detects that an enterprise is under attack without evidence that a significant part of the enterprise is compromised. |
| | Compromised enterprise | An endpoint detects that significant part of the enterprise is compromised (machines/users). |
| Service (e.g., a web site) | Malicious | A URL (Uniform Resource Locator) has a malicious reputation. |
| Data | Compromised | An endpoint detects some evidence that some business-related data in the enterprise is compromised. |
| | Corrupted | An endpoint detects some evidence that some business-related data in the enterprise is corrupted. |

In the present illustrative ESAS arrangement, four levels of severity are typically utilized: low, medium, high, and critical. Three levels of fidelity are typically utilized: low medium, and high. Note that the number of levels for both severity and fidelity can be arranged to be different depending on the assessment category. For example, it is possible to use the three severity levels for the assessment category of "vulnerable machine" while using four severity levels for the assessment category of "compromised machine." The particular choice of number of levels to be utilized will depend on the requirements of a specific application of the present enterprise security assessment sharing.

A security assessment uses information that is available at the time the assessment is made and relies on the particular security expertise and knowledge that is resident in the endpoint that produces it. A security assessment is tentative because confidence in any particular event can never be absolute, and also because the assessment is temporary in nature as it relies on information that is present at the time it was produced. At some future time, other information will be available, so the security assessment may change.

The tentative nature of a security assessment is reflected in two fields included in each assessment—fidelity and time-to-live ("TTL"). The fidelity field provides a way for endpoints to express their confidence level in an assignment of a broader contextual meaning to information being analyzed. The TTL field enables endpoints to reflect the best estimate of the time period for which the security assessment is expected to be valid. Or alternatively, the TTL field provides the best estimate for a future security assessment update. When a TTL expires, an endpoint that takes actions based on a security assessment to which it subscribes is expected to roll-back such actions when the TTL of that assessment expires. Thus, the TTL provides a safety valve functionality to prevent a user or a machine from getting inappropriately trapped with restricted access due to a false positive, or the loss of a message somewhere in the enterprise. However, if such restricted access is indeed appropriate, then either a new security assessment may be generated to continue the restriction, or the TTL extended.

Figure 4:
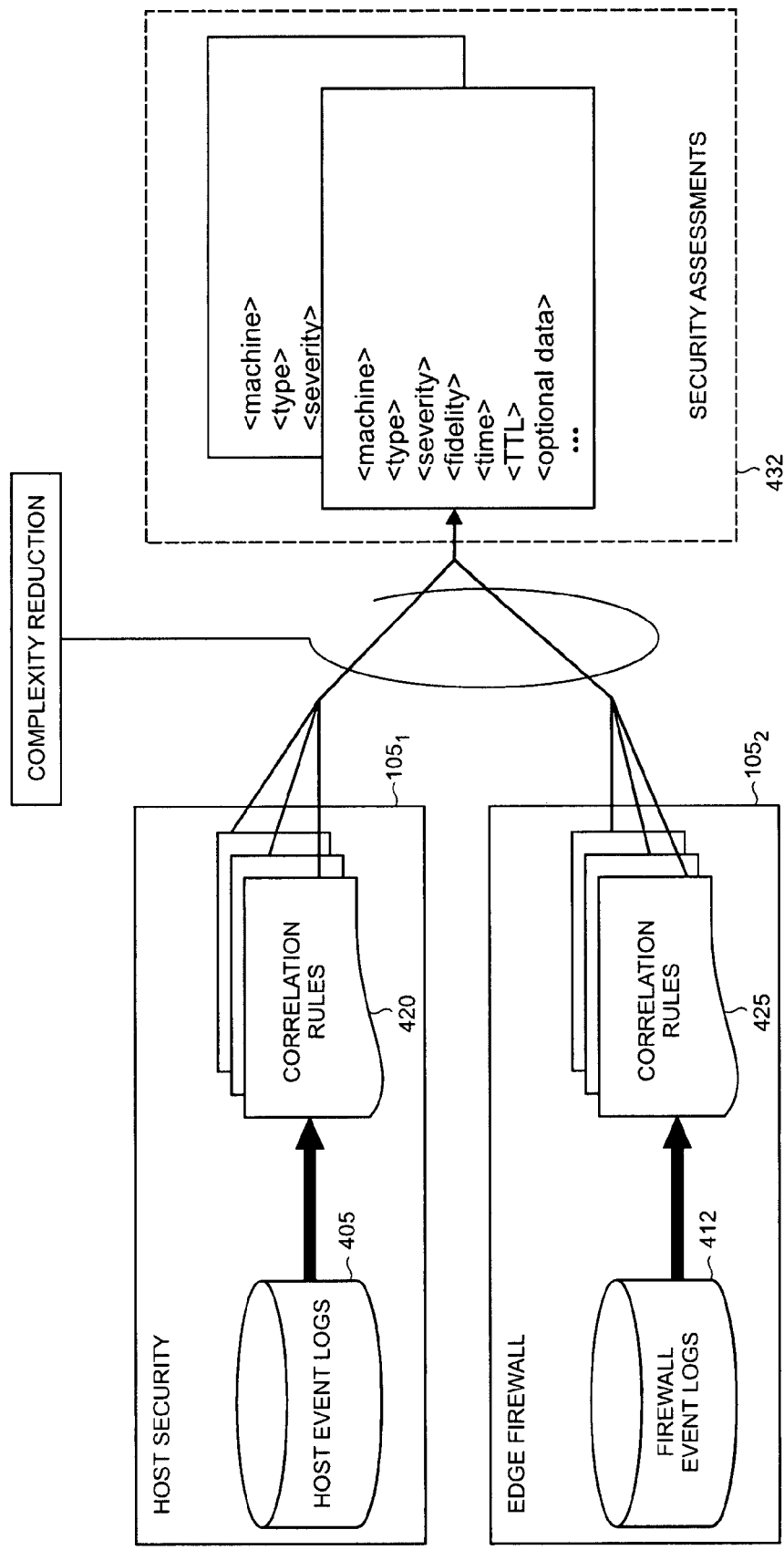
FIG. 4 shows two illustrative endpoints and the complexity reduction enabled by the utilization of the present security assessment arrangement.

The security assessment is designed to enable precise semantics (i.e., the meaning imparted by the categorization used in the security assessment) using a compact vocabulary. As shown in FIG. 4, two of the endpoints 105 in the enterprise log data about events that occur in their respective areas of interest. The host event logs 405 and firewall event logs 412 thus contain very large amounts of data. Typically, the data is processed in the respective endpoints using correlation rules 420 and 425 in order to identify events of interest. The correlation rules, which are often numerous, define the localized sponsors or actions taken responsibly to a detected event.

By comparison, the security assessments, indicated by reference numeral 432, contain only a relatively small amount of data. As security assessments are utilized to assign broad context to information, they provide answers to the questions: Who created the assessment? When? Why? For how long? And, on which object does the assessment apply? Thus, in order to make use of a security assessment, an endpoint need only understand the few assessment types of interest as compared with the unbounded number of information messages that result from application of the correlation rules. Accordingly, the complexity of the data collected by each endpoint is reduced by mapping information into one or more of the assessment types. Using security assessments thus enables relevant information to be provided to subscribing endpoints without requiring that large amounts of data or information be shared across the enterprise.

Table 2 below provides an illustrative set of fields that may be included in a typical security assessment.

| Field | Description |
|---|---|
| Incident ID | A unique identifier that represents the incident for which a security assessment was created. Since there may be several assessments that are tied to the same incident (e.g., detection, response, approval, cancellation), this field also uses a correlation value |
| Instance ID | A unique identifier that represents a single security assessment message |
| Source | Endpoint type (e.g., host security, edge firewall, NAP, NIDS, etc.) and unique endpoint ID |
| Relates To | If an assessment was created responsively to other security assessments then this field will contain the list of all the assessment's incident IDs |
| Object type | host, user, reputation, enterprise or other object type |
| Object ID | An identifier for the object. Endpoints often describe the same object in different ways. For example, a host can be identified by its FQDN (Fully Qualified Domain Name), IP (Internet Protocol), MAC (Media Access Control), or SMTP (Simple Mail Transfer Protocol) addresses, etc. |
| Category | Compromised, Vulnerable, Under Attack etc. |
| Operation | Published (upon detection), response, approval, cancellation, etc. |
| Severity | Severity of the incident |
| Fidelity | Confidence of the endpoint in its detection of an incident |
| Creation time | GMT (Greenwich Mean Time) and local time |
| TTL | Time-to-Live in minutes |
| Description | A human-readable format that explains why the assessment was created |
| Data | Private information about why the assessment was |

| Field | Description |
| --- | --- |
| | created. Other endpoints may use this data for additional correlations |
| Response | (Optional) a compound node that contains the set of responses that were taken by the endpoint |
| By | (Optional) in case the assessment was approved/canceled/created by a user, this field will contain the name of the user |
| Version | Schema version of the assessment |

Using the fields in Table 2, a security assessment is capable of expressing the following events:

1. Detection. An endpoint executes some analysis to deduce that some abnormal behavior has occurred (compromised machine, vulnerable machine, compromised user, etc.);
2. Response. Endpoints take actions as a result of security assessments. An endpoint should notify the system (specifically, the ESAS central server 216 in FIG. 2) when actions are taken. Responses may include, for example, blocking traffic, triggering a scan, resetting a password, collecting more data about a machine, and similar actions. Note that some responses such as resetting a password or triggering a scan are intermittent, while other responses are persistent and need to be rolled back in order to be canceled;
3. Assessment approval. An administrator can approve assessments manually using an interface to the ESAS central server 216. Endpoints shall be notified upon such approval so they will perform the "required manual approval" responses;
4. Cancellation. An administrator or an endpoint can cancel an existing security assessment;
5. Response roll-back. An endpoint notifies the system (ESAS central server 216 in FIG. 2) that it rolled-back all responses/actions that were taken due to a specific assessment;
6. Health information assessments such as connectivity verifiers, latency checking, and error information;
7. Request for investigation data. This is a request from an endpoint to another endpoint to send all its data about an object collected in a given time period; and
8. Request for investigation data completed. This is a method for the endpoint to acknowledge that it performed the request. The response to the request is sent after the data was stored/sent.

In this illustrative example of enterprise security assessment sharing, each endpoint is arranged to perform at least some of the tasks noted below. In some arrangements, each endpoint is enhanced with additional functionality as required to perform such tasks through use of a discrete ESAS agent. Alternatively, the enhanced functionality may be more tightly integrated into the core functionality provided by the endpoint, and a separate or discrete agent may not necessarily be embodied in the endpoint. Such tasks include:

1. Generating new security assessments based on the locally available information about the monitored system and the security context;
2. Subscribing to a subset of available security assessments from other endpoints;
3. Processing incoming security assessments to thereby influence the security context. The processing can result in the generation of new security assessments;
4. Taking local actions according to response policies;
5. Rolling back (self-recovery) a local action when an assessment that caused it expires (i.e., expiration of the associated TTL).

Figure 5:
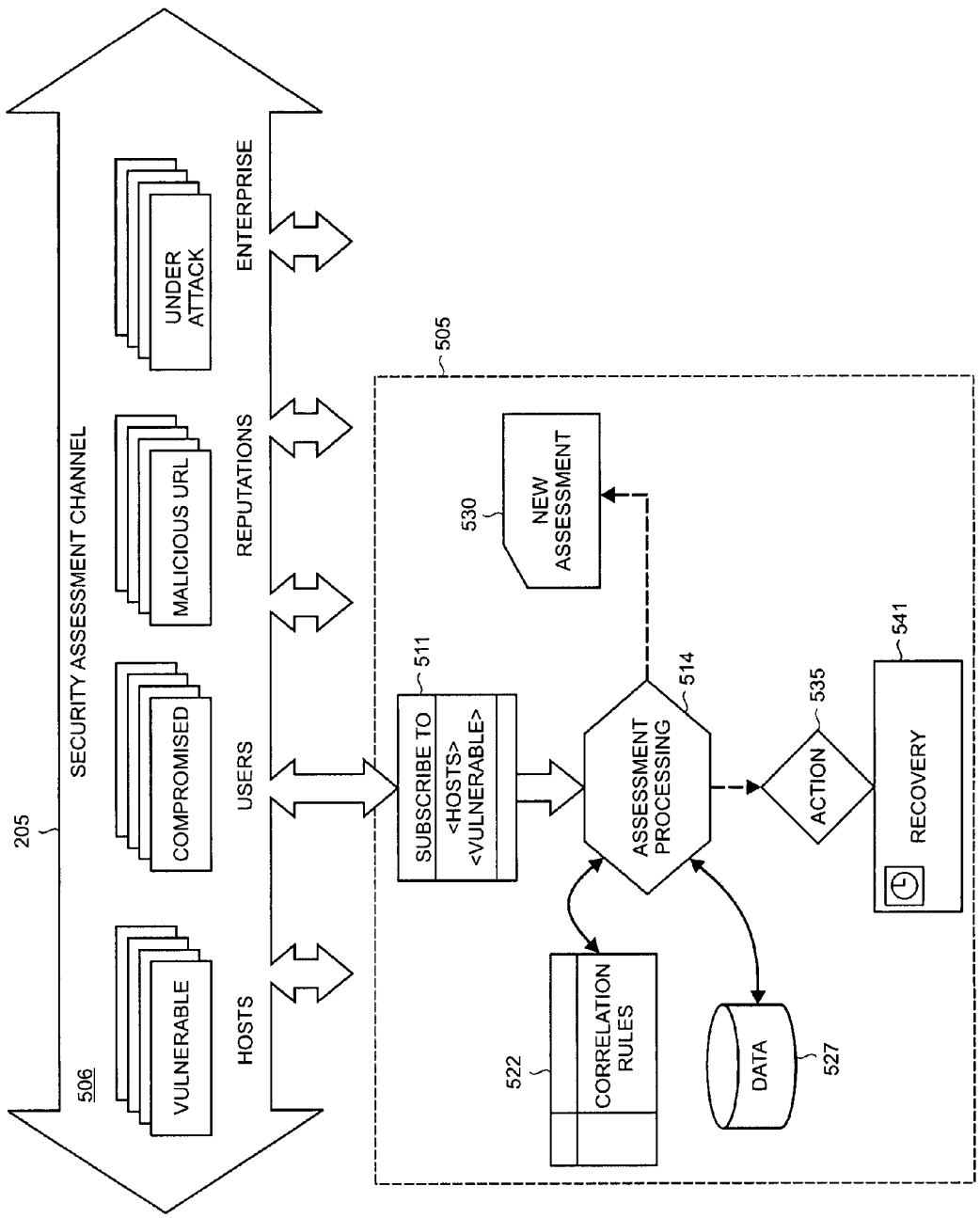
FIG. 5 shows an illustrative example of functionality disposed in an endpoint that enables sharing of security assessments.

FIG. 5 shows an illustrative example of an ESAS agent 505 disposed in an endpoint which subscribes to a subset of available assessments from other endpoints 105-1, 2 . . . N (FIG. 1) over the security assessment channel 205. As noted above, the functionality provided by ESAS agent 505 may alternatively be directly integrated with the core functionality of the endpoint.

A plurality of security assessments 506 are available for each of the security assessment types (i.e., hosts, users, reputations, and enterprise). As indicated by reference numeral 511, in this illustrative example, ESAS agent 505 subscribes to security assessments having a "Host" object type with an assessment category of "Vulnerable." It is emphasized that a particular combination of object types and assessment categories that is of interest can be different for different endpoints. Again, using the loosely coupled publish/subscribe model there is no requirement that every endpoint subscribes to every security assessment.

At process block 514, the endpoint processes the received security assessment using correlation rules 522 and locally-available data 527 that may be of some relevance. The outputs of such assessment process include the generation of the new assessment 530 and/or an invocation of a local action 535. As noted above, such local action is subject to roll-back 541 (i.e., self-recovery) when the received assessment expires according to the TTL field contained therein.

ESAS agent 505 interprets security assessments according to the following rules:

1. In generating a security assessment about a particular object, an endpoint can take into account any combination of the following:
    a) All of the locally-available information about the object or any other objects the endpoint monitors;
    b) All the currently active security assessments (i.e., those having an unexpired TTL) the endpoint has received;
    c) All the local actions the endpoint has taken in the past.
2. All of the endpoints in the present enterprise security assessment sharing arrangement comply with the principle that all of the sets of locally-available information in the endpoints are mutually exclusive. That is the present arrangement has no more than one endpoint processing a particular piece of local information.
3. Security assessments are typically interpreted as describing an endpoint's assessment about the current and future security state of an object.

It is important to note that the Rule 2 refers to the exclusivity of information and not data as these terms were defined above. Two endpoints can process the same or overlapping data sources provided that the information they extract from the data and later use to generate assessments is exclusive.

To illustrate the implications of Rule 3 consider the following example where a scheduled antivirus scan of a machine detects and removes a piece of known malware. Based on this detection, other locally available information, a received currently active assessment, and on the endpoint's embedded knowledge about current security incidents, the endpoint may conclude one of the following: 1) a machine was infected in the past, but is now clean and does not pose any additional future security risk; 2) The machine was infected and, while the particular malware was removed, it is possible or likely that it still poses a security risk. According to Rule 3, an endpoint should generate a security assessment about the machine in the latter case and not generate one in the former.

Figure 6:
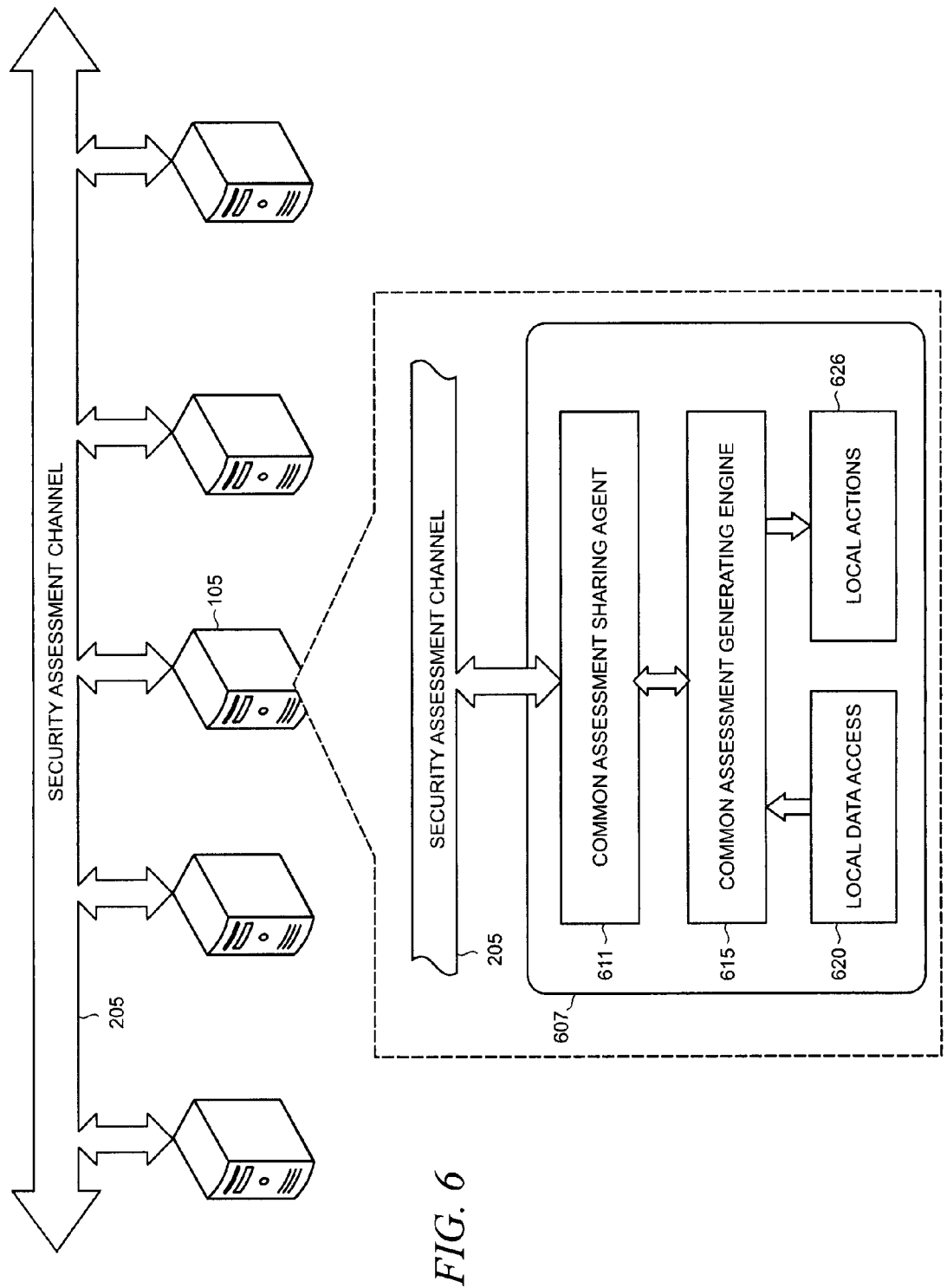
FIG. 6 is a simplified block diagram of an illustrative architecture for an ESAS-enabled endpoint.

FIG. 6 is a simplified block diagram of an illustrative architecture 607 for an endpoint 105 that is ESAS-enabled. Architecture 607 comprises two modules, the common assessment sharing agent 611 and the common assessment generating engine 615, that are commonly-utilized by all endpoints 105. These common components enable a standardized ESAS interface to be applied for enabling on-demand extensibility as new endpoints, features, and options are added to an enterprise. By comparison, the local data access module 620 and the local actions module 626 are unique to each particular endpoint 105. The local data access module 620 is arranged for accessing the locally-available data pertaining to an object that is being monitored by a particular endpoint 105. The local actions 626, as described above, are typically taken by an endpoint in accordance with response policies.

The common assessment sharing agent 611 functions as an abstraction layer between its clients and the security assessment channel 205. Accordingly, the common assessment generating engine 615 is agnostic as to the topology of the security assessment channel 205, and any details of its behavior. The main functionalities of the common assessment sharing agent 611 include a) subscribing to security assessments from the channel 205; b) publishing security assessments to the channel 205; c) sending security assessments; and, d) receiving security assessments. This last functionality may be arranged to support an asynchronous mode of receiving.

The common assessment sharing agent 611 is generally arranged to support a methodology in which delivery of security assessments to subscribing endpoints is guaranteed. For example, if an endpoint is out of service or otherwise not in communication with the security assessment channel 205, the common assessment sharing agent 611 will track the service status of that endpoint and resend the security assessment once the endpoint is back in service. The security assessment sharing agent 611 is typically configured to enable traverse across firewalls and NAT (Network Address Translation) devices. In addition, typical security methodologies may be utilized by the common assessment sharing agent 611 including for example, ones of the various authorization, authentication, encryption, and certification paradigms that are currently available.

The common assessment generating engine 615 embodies a commonly-utilized infrastructure in all ESAS-enabled endpoints for security assessment generation, security assessment handling, and invocation of responses and actions. The common assessment generating engine 615 functions as an adapter, or go-between, between the endpoint and the security assessment channel 205. Accordingly, the functionalities of the common assessment generating engine 615 include a) assessment generation by correlating a combination of ones of locally-available data, received security assessments, and a history of past actions; b) tracking active assessments (i.e., those in which to the TTL contains a non-expired value); c) generating security assessments with the manual approval feature, as described above; d) generating cancellation messages; and, e) tracking expiration of security assessments, and rolling-back actions as appropriate.

The common assessment generating engine 615 is further generally arranged to maintain a persistent state between service restarts, thus it maintains knowledge of all objects that were being handled by it and active prior to the restart. In addition, the common assessment generating engine 615 maintains an awareness of configuration changes that are occurring in the environment, for example as occur in the illustrative scenarios described below.

Figure 7:
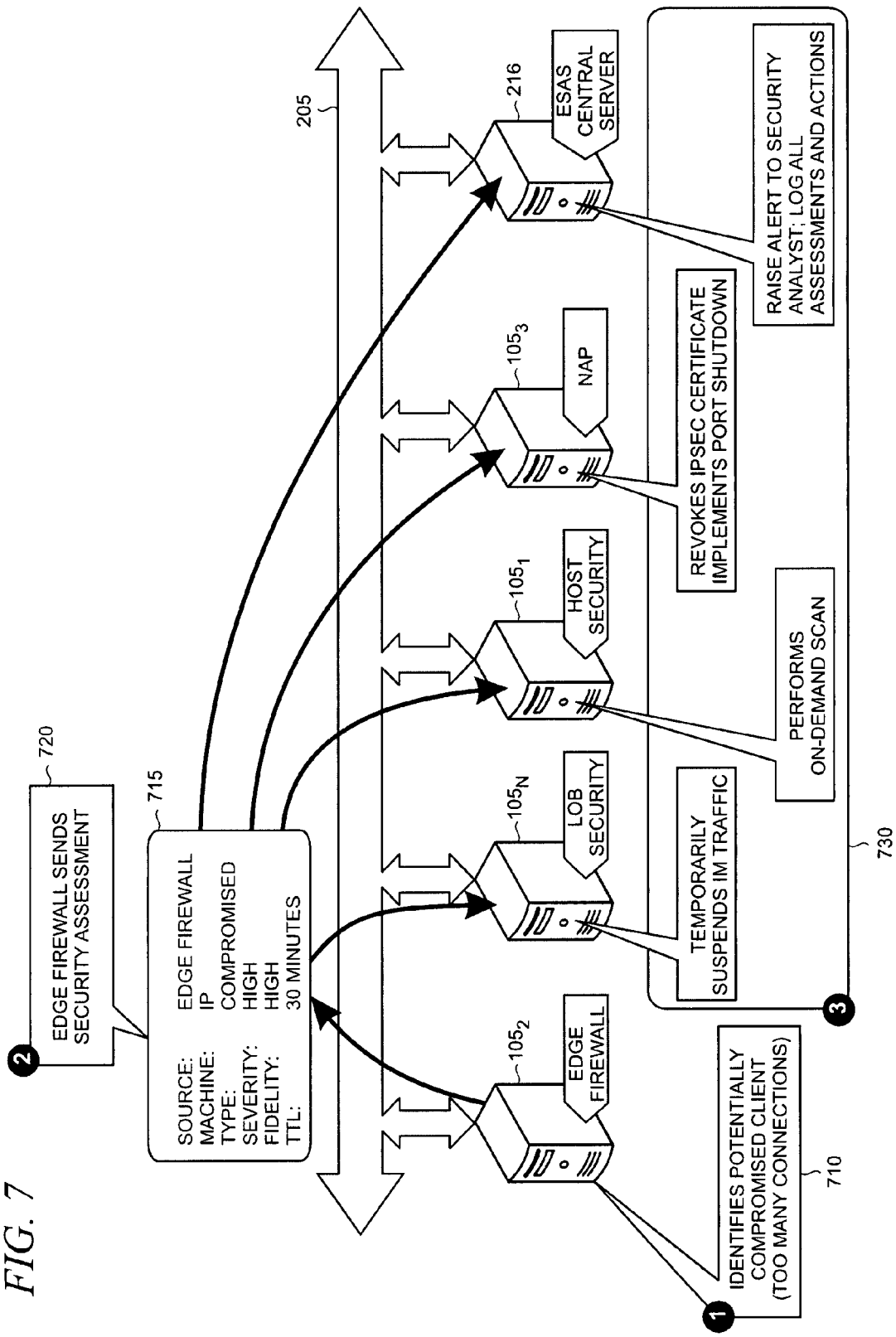
FIG. 7 is a diagram of a first illustrative scenario in which a plurality of ESAS-enabled endpoints are coupled to a security assessment channel and a detected incident at one endpoint triggers responses at multiple other endpoints.

FIG. 7 is a diagram of a first illustrative scenario in which a plurality of ESAS-enabled endpoints are coupled to the security assessment channel 205, and a detected incident at one endpoint triggers responses at multiple other endpoints. This illustrative scenario is described in three stages. As indicated by reference numeral 710, the edge firewall $105_2$ first identifies a potentially compromised client, for example, because it creates so many connections to the perimeter network 112 (FIG. 1) that the most likely explanation for the behavior is the existence of a security compromise. Second, the edge firewall $105_2$ sends a security assessment 715 that indicates the particular client is "compromised" with high severity and high fidelity, as indicated by reference numeral 720, over the security channel 205 to subscribing endpoints.

Third, the subscribing endpoints 105-1, 3 . . . N and the ESAS central server 216 which receive the security assessment 715 apply their specific security expertise through the application of their own correlation rules and locally-available data to trigger an appropriate action. As collectively indicated by reference numeral 730 in FIG. 7, the host security endpoint $105_1$ performs an on-demand scan. The NAP endpoint $105_3$ revokes the IP security certificate for the identified compromised client and implements a port shutdown. The line-of-business security endpoint $105_N$ temporarily suspends instant messaging ("IM") traffic to the compromised client based on the received security assessment 715. The ESAS central server 216 raises an alert for a security analyst (e.g., an administrator) and also logs all of the security assessments and actions invoked.

Figure 8:
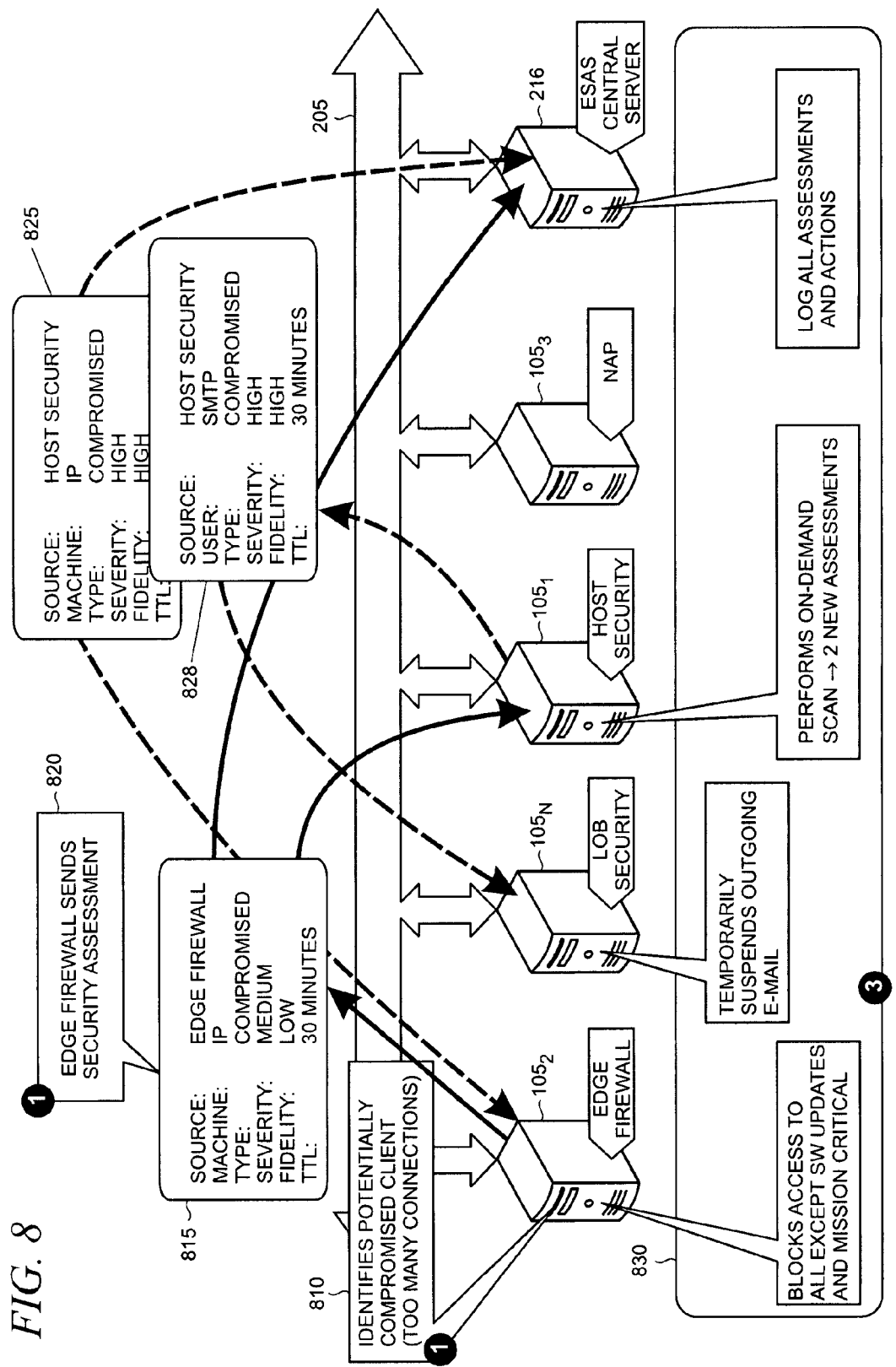
FIG. 8 is a diagram of a second illustrative scenario in which a low fidelity security assessment is sent over the security assessment channel that triggers the generation of a new high fidelity assessment by a receiving ESAS-enabled endpoint which also performs cross-object mapping.

The first illustrative scenario described above provides a case where the endpoint detecting the suspicious incident generates a security assessment with high severity and high fidelity (i.e., the endpoint has a high degree of confidence that it has validly detected a serious incident). By comparison, FIG. 8 is a diagram of a second illustrative scenario in which a low fidelity security assessment is sent over the security assessment channel 205 that triggers the generation of a high fidelity assessment by a receiving endpoint which also performs cross-object mapping.

This second illustrative scenario is also described in three stages. As indicated by reference numeral 810, the edge firewall $105_2$ first detects a large number of client connections to the perimeter network 112 (FIG. 1). However, unlike the first illustrative scenario shown in FIG. 6 and described in the accompanying text, the number of connections being established by the client is not so high that the edge firewall $105_2$ can be absolutely certain that the client has been compromised. In current enterprise security systems, when an endpoint sees such data it generally just drops the data and takes no action as there is not enough evidence to warrant the typically harsh response such as disconnecting the machine. By comparison, in the present scenario the edge firewall $105_2$ in the second stage sends a security assessment 815 over the security assessment channel 205 that indicates that the particular client is compromised with medium severity and low fidelity, as indicated by reference numeral 820.

Here, the subscribing endpoints to the particular object referenced in the security assessment 815 generated by the edge firewall $105_2$ include the host security endpoint $105_1$ and the ESAS central server 216. While such a low fidelity data normally does not trigger an action to be taken at an endpoint in current security products, in accordance with the present enterprise security assessment sharing, the host security endpoint $105_1$ looks at its own local data differently in light of the received security assessment from the edge firewall $105_2$. In this case, the local data resulting from an on-demand scan at the host security endpoint $105_1$ and the information contained in the security assessment from the edge firewall $105_2$ are used to generate new assessments 825 and 828. Thus, the host security endpoint $105_1$ has information that, by itself, does not warrant the generation of a new security assessment, but when reinforced with even a low fidelity assessment from another endpoint, as in this case, there is sufficient evidence to justify the creation of the new security assessments 825 and 828 which each have high fidelity.

The host security endpoint $105_1$ places the new security assessments 825 and 828 onto the security assessment channel 205. The new security assessments 825 and 828 are received over the security assessment channel 205 by the subscribing endpoints which, in this illustrative scenario, include the edge firewall $105_2$, and the ESAS central server 216 for security assessment 825 and line-of-business endpoint $105_N$ for security assessment 828.

Note that the line-of-business endpoint $105_N$ was not a subscriber to the original security assessment 815 produced by the edge firewall $105_2$ because the reference object type is a machine and the line-of-business endpoint $105_N$, by virtue of its role in protecting e-mail, is typically concerned with the users. However, in this second illustrative scenario the host security endpoint $105_1$ maps from a host object type to a user object type when it generates a new security assessment 828. Such cross object mapping capability may be beneficial in many scenarios as it is contemplated that a high severity incident, such as malware or malicious activity that potentially compromises the data confidentiality or integrity of a host computer, may also potentially compromise the user as well. A security assessment may be generated that cross maps the high severity incident from the host object type to a user object type with a certain degree of fidelity. Similarly, a critical severity incident in which malware or malicious activity has actually caused a loss of data integrity on a host computer, a security assessment for a user object type may be generated with even higher fidelity.

In stage three, the new security assessments 825 and 828 trigger a variety of respective actions at the receiving endpoints, as collectively indicated by reference numeral 830. Specifically, the edge firewall $105_2$ blocks all access by the compromised client with the exception of software updates and/or mission-critical access. The line-of-business endpoint $105_N$ temporarily suspends outgoing e-mails. And, as with the first illustrative scenario, the ESAS central server 216 continues to log all assessments and actions. As noted above, such restrictions are enforced only during the period of time for which the TTL associated with the new security assessments 825 and 828 remains valid. When the new security assessments expire, the actions taken by the respective endpoints are rolled-back unless the TTL is extended or a new security assessment which invokes the restrictive actions is received.

Figure 9:
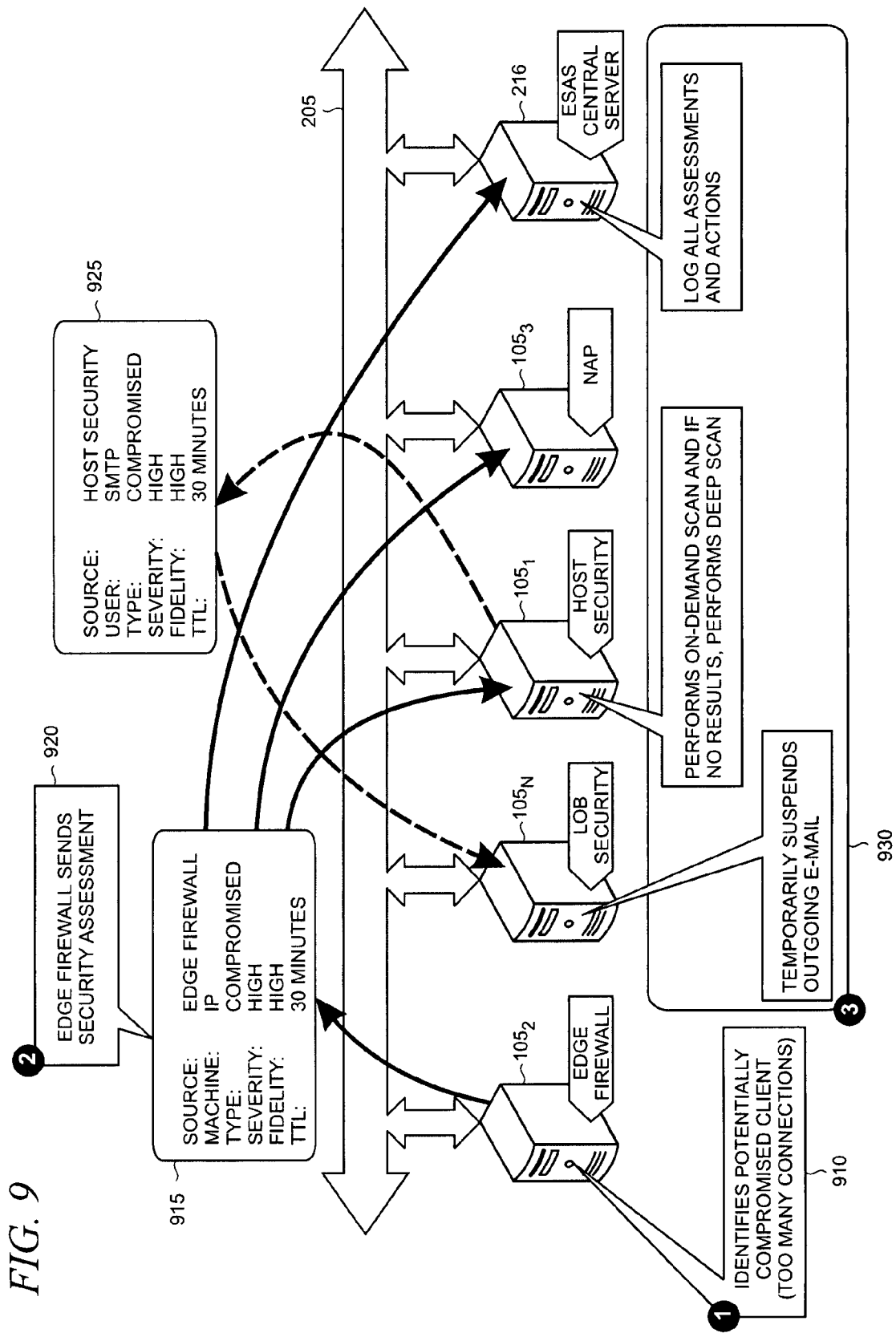
FIG. 9 is a diagram of a third illustrative scenario that shows the targeted use of remediation techniques.

FIG. 9 is a diagram of a third illustrative scenario that shows the targeted use of remediation techniques. This third illustrative scenario is described in three stages. As indicated by reference numeral 910, the edge firewall $105_2$ first detects a large number of client connections to the perimeter network 112 (FIG. 1). Second, the edge firewall $105_2$ sends a security assessment 915 that indicates the particular client is "compromised" with high severity and high fidelity, as indicated by reference numeral 920, over the security channel 205 to subscribing endpoints. The subscribing endpoints include the host security endpoint $105_1$ the NAP endpoint $105_3$ and the ESAS central server 216.

The host security endpoint $105_1$ reviews the received security assessment and applies its specific security expertise using correlation rules and any relevant locally-available data. In this illustrative example, the host security endpoint $105_1$ responsively generates a new security assessment 925 containing a user object type to which the line-of-business security endpoint $105_N$ subscribes.

In the third stage of the scenario, the remediation techniques employed by the endpoints are considered expensive in terms of their potential impact on business operations within the enterprise 100 (FIG. 1). For example, as indicated by reference numeral 930, the line-of-business security endpoint $105_N$ implements a response policy that entails temporarily suspending outgoing e-mail. In addition, the host security endpoint $105_1$ performs an on-demand scan and if no results are achieved, performs a deep scan. While such remediation techniques can be very effective in addressing malware, malicious users, and other problems, they typically impart significant expense to the enterprise. For example a user whose outgoing e-mail is suspended will be less productive, and deep scanning typically requires one or more reboots which will remove the machine from service for a period of time.

The present ESAS arrangement advantageously enables these effective, albeit expensive, remediation techniques to be applied in a targeted manner, and not merely in a general way or across-the-board which can be unjustified for some machines and/or users. Only objects in the environment that are deemed suspicious, using pre-defined criteria, will be subject to these particular remediation techniques.

Figure 10:
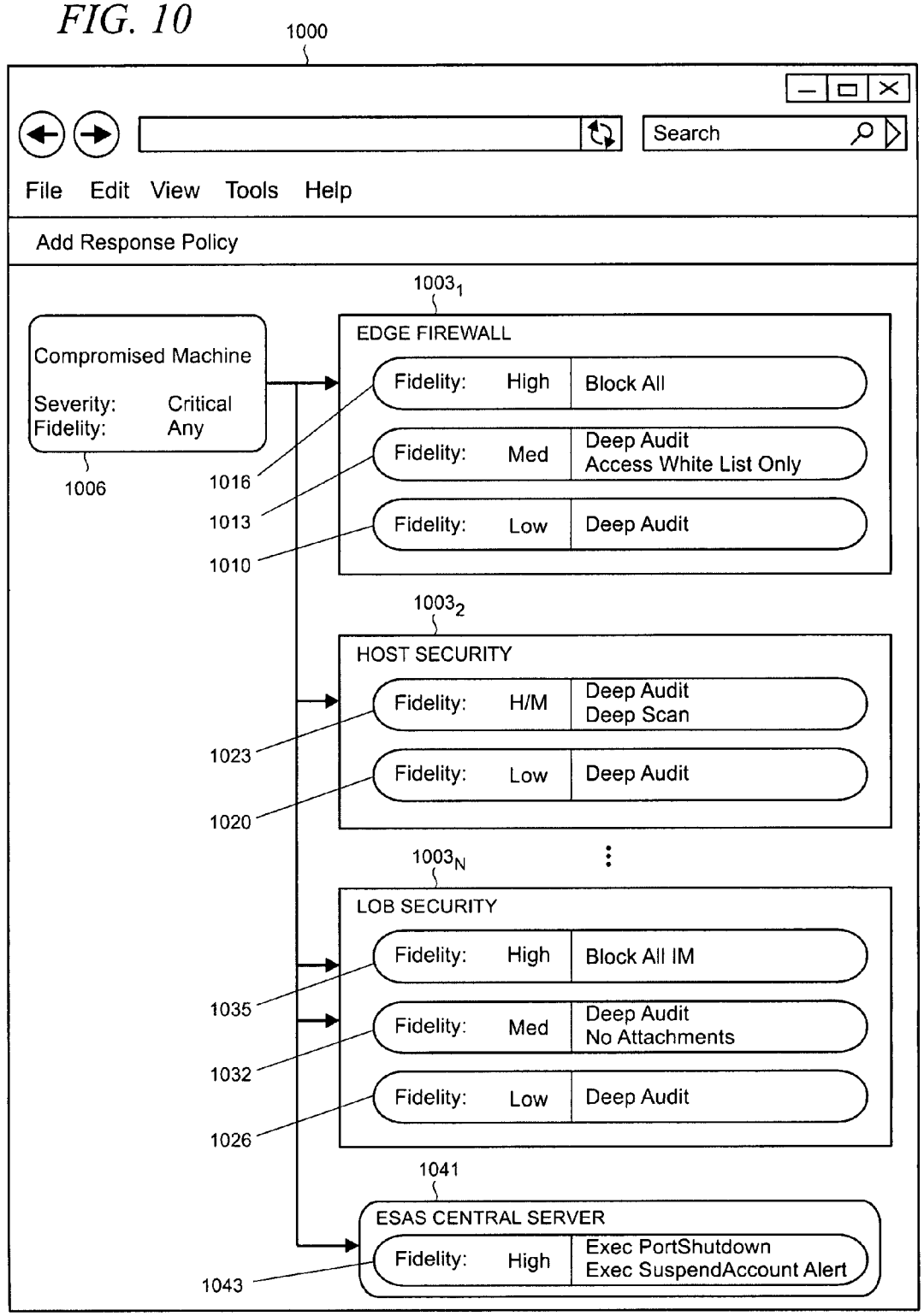
FIG. 10 shows an illustrative screen that is provided by a graphical user interface ("GUI") which enables a user, such as an administrator, to manage and define the response policies of ESAS-enabled endpoints in the enterprise

FIG. 10 shows an illustrative screen 1000 that is provided by a graphical user interface ("GUI") which enables a user, such as an administrator, to manage and define the response policies of endpoints in the enterprise 100 (FIG. 1). In some applications, the GUI is hosted on the ESAS central server 216 (FIG. 2). Advantageously, the semantic abstraction layer embodied by the security assessments enables enterprise-wide security policies to be established using a very compact and clear methodology. That is, response policies may be configured using a security assessment as a defined starting point without being concerned as to which endpoint in the enterprise created the security assessment, or how the endpoint came to the conclusion reflected in the security assessment. The security assessments, with their compact taxonomy, thus function as natural anchors to enterprise-wide security response policies. Without the present ESAS arrangement to streamline the configuration of response policies, a user would need to consider every event and/or alert that every endpoint could possibly generate, and then define what to do with each such event.

Screen 1000 is an illustrative example showing the configuration of enterprise-wide response policies, using fields 1003-1, 2 ... N for a number of different endpoints, for the case of an assessment category of a compromised machine with critical severity, which defines a starting point (i.e., "anchor" point) for the response policy configuration as indicated by reference numeral 1006. It is emphasized that other user interface screens would be utilized for other assessment categories, object types, severity levels, etc., so that the user is enabled to define response policies for the plurality of different starting points that are likely to be used in a particular enterprise security environment. The response policies, in this particular example, are set depending upon the fidelity of a particular security assessment for a set severity level of "Critical." Fields 1003 include a number of respective subfields that are arranged to reflect user-defined input, using for example, text entry boxes, drop-down menus, and the like that are employed in typical GUIs.

As indicated in subfield 1010, for a security assessment indicating a compromised machine with critical severity, the edge firewall $105_2$ (FIG. 1) is configured to increase the amount of auditing (i.e., moving to a deep audit level that increases the amount of data collected as compared with a normal level of auditing) when a security assessment has low fidelity. Subfield 1013 shows that for an assessment having medium fidelity, the edge firewall 105₂ increases the auditing level and also restricts Internet access to the suspected compromised machine to only "white list" URLs which typically include sites that are known to not be malicious. When the fidelity is high, as shown by subfield 1016, access to the Internet is blocked completely.

Field 1003₂ shows the response policy configuration for the host security endpoint 105₁ (FIG. 1). For a security assessment having low fidelity and indicating a compromised machine with critical severity, the host security endpoint 105₁ increases the amount of auditing to a deep audit level, as indicated by subfield 1020. Subfield 1023 indicates that for the cases of medium and high fidelity, the host security endpoint 105₁ increases its auditing, and also increases performs a deep scan of it hosts (where a "deep" scan may entail the computer to be rebooted one or more times).

Field 1003ₙ shows the response policy configuration for the line-of-business security endpoint 105ₙ (FIG. 1). For a security assessment having low fidelity and indicating a compromised machine with critical severity, the line-of-business security endpoint 105ₙ increases the amount of auditing to a deep audit level, as indicated by subfield 1026. Subfield 1032 indicates that for a security assessment having medium fidelity, the line-of-business security endpoint 105ₙ increases its data collection to a deep audit, and also restricts file attachments to e-mail. Subfield 1035 indicates that for a security assessment having high fidelity, line-of-business security endpoint 105ₙ blocks all instant messaging ("IM") traffic.

Field 1041 shows the response policy configuration for the ESAS central server 216 in FIG. 2. For a security assessment having high fidelity, the ESAS central server 216, as indicated in subfield 1043, executes a port shutdown for the affected machine and generates an alert that the associated user account has been suspended. As with the subfields discussed above, subfield 1043 is typically arranged to accept user-defined input.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An architecture implemented on a computer for a security product endpoint arranged for use in an enterprise security environment, the architecture comprising:
    a communication channel that is commonly accessible by each security product endpoint in a plurality of security product endpoints that are deployed in the enterprise security environment;
    a common assessment sharing agent that is arranged for implementing a publish and subscribe model for security assessments over the common communication channel, wherein both publishers and subscribers on the security channel are security product endpoints, each security assessment being categorized by type and being published to the common communication channel, and arranged to provide contextual meaning to an object in the environment; and
    a common assessment generating engine that is operatively coupled as a client to the common assessment sharing agent, and arranged for generating a security assessment according to rules which take into account any combination of
    a. locally-available information about the object or other objects being monitored by a security product endpoint,
    b. currently active security assessments received by the security product endpoint, and
    c. local actions taken by the security product endpoint in the past, in which sets of locally-available information for the security product endpoints are mutually exclusive,
    the common assessment generating engine being further arranged for generating the security assessment for transmission over the common communication channel by correlating the locally-available information data to a security assessment to which the security product endpoint subscribes.

2. The architecture of claim 1 in which the security assessment provides the contextual meaning using a pre-defined taxonomy.

3. The architecture of claim 2 in which the pre-defined taxonomy utilizes a schematized vocabulary comprising object types and assessment categories.

4. The architecture of claim 1 in which the common assessment generating engine is further arranged for invoking a response in accordance with a response policy.

5. The architecture of claim 4 in which the response is one of taking a local action or taking no action.

6. The architecture of claim 5 in which the common assessment generating engine is further arranged for managing all active security assessments received over the channel, an active security assessment having a time-to-live field value that is unexpired.

7. The architecture of claim 6 in which the common assessment generating engine is further arranged for rolling-back the local action upon expiration of the time-to-live field value.

8. The architecture of claim 4 in which the common assessment generating engine is further arranged for generating an action-taken message that describes the local action.

9. The architecture of claim 8 in which the common assessment sharing agent is arranged for sending the action-taken message over the communication channel.

10. The architecture of claim 1 in which the common assessment generating engine is further arranged for generating a cancellation message for marking a security assessment as cancelled.

11. The architecture of claim 1 in which the common assessment sharing agent is arranged for performing at least one of authorization, authentication, or encryption.

12. The architecture of claim 1 in which the common assessment sharing agent is arranged for maintaining an awareness of security assessment channel configuration changes and adaptively reconfiguring itself responsively to such configuration changes.

13. A method for extending an enterprise security topology to a new security product endpoint being added to the topology, the method comprising the steps of:
    configuring security product endpoints to share security assessments over a common communication channel;
    maintaining one or more tables for describing a publish and subscribe model by which a publishing security product endpoint publishes a security assessment over the common communication channel to which a subscribing security product endpoint subscribes according to a subscription, the publishing being performed according to rules which take into account any combination of a. locally-available information about an object being monitored by a security product endpoint,
b. currently active security assessments received by the security product endpoint, and
c. local actions taken by the security product endpoint in the past, in which sets of locally-available information for the security product endpoints are mutually exclusive, the security assessment describing an object being monitored by a security product endpoint, and the description using a taxonomy that is commonly-understood by a plurality of security product endpoints, the security assessment being further categorized by type and describing an object being monitored by a security product endpoint, and the description using a taxonomy that is commonly-understood by the plurality of security product endpoints; and updating the one or more tables with a description of a security assessment type for which the new security product endpoint publishes, and a description of a security assessment type to which the new security product endpoint subscribes.

14. The method of claim 13 in which the maintaining and updating are performed using an abstraction layer on which the publish and subscribe model operates.

15. The method of claim 14 in which the abstraction layer includes an API for reading security assessments to which an endpoint subscribes and an API for writing security assessments for which an endpoint publishes.

16. An enterprise security network, comprising:
a common communication channel, operatively coupled to each of a plurality of security product endpoints, and arranged for providing a transport layer over which a published security assessment is received; and a plurality of security product endpoints, each of the security product endpoints being enabled with security assessment sharing functionality by which a publishing security product endpoint publishes a security assessment over the common communication channel to which a subscribing security product endpoint subscribes according to a subscription, the security assessment being categorized by type and describing an object being monitored by a security product endpoint, and the description using a taxonomy that is commonly-understood by each of the plurality of security product endpoints, the publishing security product endpoint generating a security assessment according to rules which take into account any combination of a. locally-available information about the object or other objects being monitored by the security product endpoint,
b. currently active security assessments received by the security product endpoint, and
c. local actions taken by the security product endpoint in the past, in which sets of locally-available information for the security product endpoints are mutually exclusive.

17. The enterprise security network of claim 16 further including a central management server that is arranged for subscribing to all security assessments published by the plurality of endpoints.

* * * * *